United States Patent [19]

Nakajima et al.

[11] Patent Number: 4,906,847
[45] Date of Patent: Mar. 6, 1990

[54] RADIATION IMAGE READ-OUT AND REPRODUCING APPARATUS

[75] Inventors: Nobuyoshi Nakajima; Toshitaka Agano; Ryousuke Furue, all of Kanagawa, Japan

[73] Assignee: Fuji Photo Film Co., Ltd., Kanagawa, Japan

[21] Appl. No.: 291,015

[22] Filed: Dec. 28, 1988

[30] Foreign Application Priority Data

Dec. 29, 1987 [JP] Japan ................. 62-335506

[51] Int. Cl.[4] ............................................. G01T 1/105
[52] U.S. Cl. ................... 250/327.2; 378/165
[58] Field of Search ............ 250/327.2 R, 327.2 C, 250/327.2 J, 327.2 L, 484.1 B; 378/165

[56] References Cited

U.S. PATENT DOCUMENTS

| 4,507,797 | 3/1985 | Kato | 378/165 |
| 4,705,953 | 11/1987 | Kimura et al. | 250/484.1 |
| 4,739,480 | 4/1988 | Oone et al. | 378/165 |
| 4,760,259 | 7/1988 | Witanaba | 250/327.2 |

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image read-out and reproducing apparatus comprises a section for feeding a stimulable phosphor sheet carrying a radiation image stored thereon, a section for feeding a recording sheet, a section for photoelectrically reading ID information, and a light beam scanning section. The light beam scanning section comprises a read-out main scanning system for scanning a light beam in a main scanning direction on the stimulable phosphor sheet, a reproducing main scanning system for scanning a light beam in a main scanning direction on the recording sheet, and a sub-scanning system for moving the stimulable phosphor sheet and the recording sheet in a sub-scanning direction, thereby to read out a radiation image from a stimulable phosphor sheet and to reproduce a radiation image and ID information on a recording sheet by modulating the light beam in the reproducing main scanning system in accordance with a radiation image read out and information detected by the ID information reading section.

5 Claims, 3 Drawing Sheets

RADIATION IMAGE READ-OUT AND REPRODUCING APPARATUS

BACKGROUND OF THE INVENTION

1. Field of the Invention

This invention relates to a radiation image read out and reproducing apparatus for use in a radiation image recording and reproducing system, wherein both read-out and reproduction of a radiation image are carried out by use of the same scanning system in the same apparatus.

2. Description of the Prior Art

When certain kinds of phosphors are exposed to radiation such as X-ray, α-ray, β-ray, γ-rays, cathode rays or ultraviolet rays, they store part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation passing through an object such as the human body in order to have a radiation image of the object stored thereon, and is then scanned with stimulating rays, such as a laser beam, which cause it to emit light in proportion to the stored radiation energy. The light emitted by the stimulable phosphor sheet upon stimulation thereof is photoelectrically detected and converted into an electric image signal, and from the image signal the radiation image of the object is reproduced as a visible image on a recording material such as photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased so that the stimulable phosphor sheet may be reused.

The aforesaid radiation image recording and reproducing system has heretofore been composed of a recording apparatus for storing a radiation image on a stimulable phosphor sheet, a radiation image read-out apparatus for reading out the radiation image stored on the stimulable phosphor sheet and generating an image signal therefrom, and an image reproducing apparatus for reproducing a visible radiation image by, for example, scanning a recording sheet with a light beam modulated in accordance with the image signal and thus recording the visible radiation image on the recording sheet. Therefore, in order to form the final visible image of the radiation image, which was stored on the stimulable phosphor sheet, on the recording sheet in the conventional radiation image recording and reproducing system, it is necessary to provide two independent apparatuses, i.e. the read-out apparatus for reading out the radiation image from the stimulable phosphor sheet and the reproducing apparatus for reproducing the radiation image on the recording sheet, besides the recording apparatus.

In recent years, various attempts have been made to make the aforesaid radiation image recording and reproducing system small in size and to reduce the manufacturing cost of the system. However, with the conventional radiation image recording and reproducing system, the read-out apparatus and the reproducing apparatus must be provided independently of each other as mentioned above, and the size of the system as a whole is not small. Also, a scanning system and other components must be provided independently in each of the read-out apparatus and the reproducing apparatus, and therefore the manufacturing cost of the radiation image recording and reproducing system cannot be kept low.

Though an X-ray image read-out and reproducing apparatus, wherein the same light source is utilized for read-out and reproduction and read-out and reproduction are carried out alternately in one stage, is proposed in Japanese Unexamined Patent Publication No. 58(1983)-184677, only a conceptual view of the apparatus is shown in the specification thereof and no concrete configuration of the apparatus is described therein. Therefore, it is not possible to put the sapparatus into practice as it is disclosed. Also, with the proposed apparatus, scanning is carried out by moving the light source and a photodetector with respect to a sheet. With such a scanning method, the movement mechanism becomes complicated and it is not always possible to achieve quick scanning. Further, the proposed apparatus is complicated because a light modulator and the photodetector are moved by a drive mechanism into and out of the optical path of the light emitted by the light source in the course of change-over of the apparatus between its read-out and reproduction modes.

Also, when the radiation image is reproduced into a visible image by the reproducing apparatus, it is often desired that the sex, name, date of image recording and information about the object be displayed together with the radiation image. Such ID information has heretofore been recorded on an ID card or the like by a special ID entry means at the time of image recording. The entered information is transmitted to the reproducing apparatus at the time of image reproduction, and displayed on the reproducing apparatus together with the radiation image. However, in this case, a special entry means is necessary, and therefore the overall radiation image recording and reproducing system becomes complicated. Also, the ID information entry operation is troublesome, and the entry and reproduction of the ID information cannot always be carried out because there is a standard format for the ID information which is to be entered and the number of characters specifying the ID information is limited.

SUMMARY OF THE INVENTION

The primary object of the present invention is to provide a radiation image read-out and reproducing apparatus wherein radiation image read-out and reproduction are carried out by use of a single scanning system in the apparatus, and which enables a reduction in the size of a radiation image recording and reproducing system as a whole and a reduction of the manufacturing cost thereof by combining the conventional read-out apparatus and the conventional reproducing apparatus integrally with each other.

Another object of the present invention is to provide a radiation image read-out and reproducing apparatus which enables entry of ID information without using a special entry means, entry of arbitrary information and direct reproduction of the entered information on a reproduction area.

The present invention provides a radiation image read-out and reproducing apparatus comprising:

(i) a stimulable phosphor sheet feeding section for housing a stimulable phosphor sheet carrying a radiation image stored thereon, and feeding out said housed stimulable phosphor sheet, (ii) a recording sheet feeding section for housing recording sheets and feeding out said housed recording sheets one by one, (iii) an information reading section for holding an information recording means, which carries photoelectrically readable information different from said radiation image and represented by characters, or the like, and provided with an information reading means for photoelectrically reading said information, (iv) a light beam scanning section provided with a read-out main scanning means for deflecting a light beam with a light deflector and scanning said light beam in a main scanning direction across a stimulable phosphor sheet, a reproducing main scanning means for deflecting a light beam with a light deflector and scanning said light beam in the main scanning direction across a recording sheet, and a sub-scanning means for causing said stimulable phosphor sheet and said recording sheet, respectively, to be scanned in a sub-scanning direction by moving the sheets in a direction approximately perpendicular to said main scanning direction, wherein read-out of a radiation image is carried out by causing a stimulable phosphor sheet to emit light carrying information about said radiation image when exposed to the light beam in said read-out main scanning means and detecting the emitted light by use of a light detection means, and a radiation image thus read out and information detected by said information reading means are reproduced together on a recording sheet by modulating the light beam in said reproducing main scanning means in accordance with said radiation image thus read out and said information detected by said information reading means, (v) a stimulable phosphor sheet conveyance means for receiving a stimulable phosphor sheet fed out of said stimulable phosphor sheet feeding section, conveying said stimulable phosphor sheet to said light beam scanning section, and thereafter conveying said stimulable phosphor sheet out of said light beam scanning section, and (vi) a recording sheet conveyance means for receiving a recording sheet fed out of said recording sheet feeding section, conveying said recording sheet to said light beam scanning section, and thereafter conveying said recording sheet out of said light beam scanning section.

The read-out main scanning means and the reproducing main scanning means in the light beam scanning section may be common to each other in whole or in part. The information recording means may be of any type, for example, an entry sheet on which necessary ID information is handwritten. Also the information reading means may be constituted of any photoelecteic reading means. In order to make the apparatus smaller, the information reading means should preferably be constituted of a charge coupled device (CCD) or the like.

With the radiation image read-out and reproducing apparatus in accordance with the present invention wherein a read-out apparatus and a reproducing apparatus which have heretofore been provided independently of each other are combined integrally with each other by carrying out both the image read-out and the reproduction by use of the same sub-scanning system, and read-out and reproduction of a radiation image are carried out in a single apparatus, the radiation image recording and reproducing system as a whole can be made markedly smaller than the conventional radiation image recording and reproducing system. Also, with the radiation image read-out and reproducing apparatus in accordance with the present invention, wherein at least the sub-scanning means is utilized commonly for image read-out and reproduction, only a single sub-scanning means may be provided, and the manufacturing cost of the overall radiation image recording and reproducing system can be reduced. In cases where the light deflector of the main scanning means, the light source for producing the light beam and other components are also utilized commonly for image read-out and reproduction, the manufacturing cost of the overall radiation image recording and reproducing system can be further reduced. Moreover, if a part of the conveyance means is utilized commonly for the conveyance of the stimulable phosphor sheet and the conveyance of the recording sheet, the overall radiation image recording and reproducing system can be made smaller in size and the cost thereof can be lowered.

Furthermore, with the radiation image read-out and reproducing apparatus in accordance with the present invention, wherein the information reading section for photoelectrically reading ID information specified on the information recording means by the information reading means is provided, ID information can be entered by use of an arbitrary information recording means, instead of using a special ID information entry means such as an ID card and an ID card printer. Also, arbitrary information can be entered in an arbitrary format, and the entered information is reproduced directly. Therefore, the degree of freedom in the entry and reproduction of ID information is improved markedly.

DESCRIPTION OF THE PREFERRED EMBODIMENTS

The present invention will hereinbelow be described in further detail with reference to the accompanying drawings.

Figure 1:
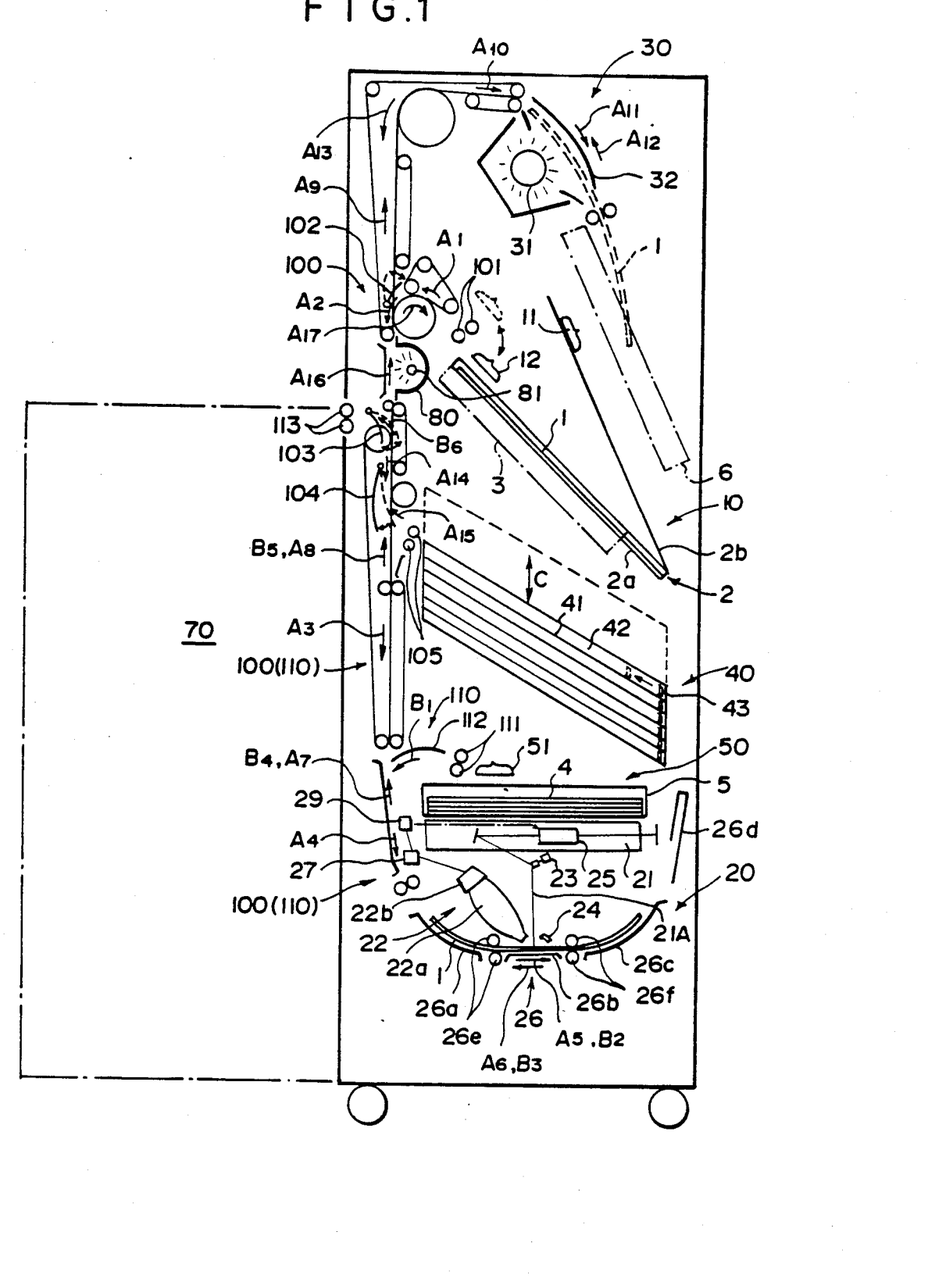
FIG. 1 is a schematic view showing the internal configuration of an embodiment of the radiation image read-out and reproducing apparatus in accordance with the present invention.
Figure 2:
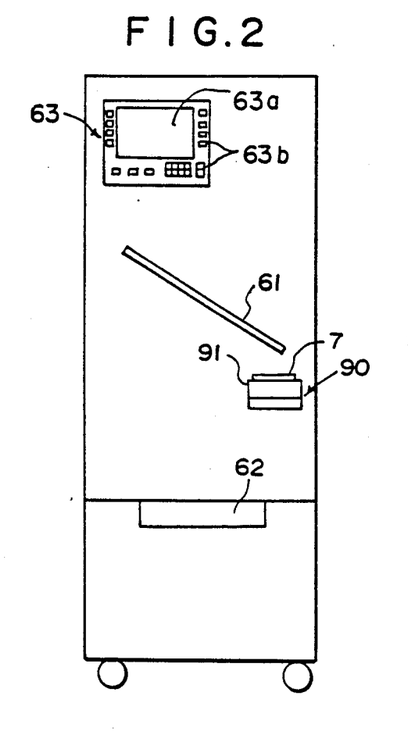
FIG. 2 is a front view of the embodiment shown in FIG. 1.

FIG. 1 shows the internal configuration of an embodiment of the radiation image read-out and reproducing apparatus in accordance with the present invention as viewed from the front, and FIG. 2 is a front view of the embodiment.

The embodiment is provided with a cassette holding section 10 which acts as a stimulable phosphor sheet feeding section by releasably holding a cassette 2 capable of housing a stimulable phosphor sheet 1 therein, a recording sheet feeding section 50 for releasably holding a recording sheet feeding magazine 5 capable of housing a plurality of recording sheets 4, 4, . . . formed of silver halide films or the like therein, a light beam scanning section 20 for reading out a radiation image stored on the stimulable phosphor sheet 1 and reproducing the radiation image thus read out on the recording sheet 4, an erasing section 30 for erasing radiation energy remaining on the stimulable phosphor sheet 1 after image readout therefrom is finished at the light beam scanning section 20, and a stacker 40 capable of housing a plurality of the stimulable phosphor sheets 1, 1, . . . therein and feeding out the housed stimulable phosphor sheets 1, 1, . . . one after another. The sections 10, 20, 30, 40 and 50 are provided one above another, and a stimulable phosphor sheet conveyance means 100 and a recording sheet conveyance means 110 extend vertically along a side of the apparatus. The aforesaid sections 10, 20, 30, 40 and 50 are connected with the stimulable phosphor sheet conveyance means 100 and the recording sheet conveyance means 110. Parts of the stimulable phosphor sheet conveyance means 100 and the recording sheet conveyance means 110 are used in common.

With reference to FIG. 2, a cassette inlet 61 for feeding the cassette 2 into the apparatus, and a magazine inlet 62 for feeding the recording sheet feeding magazine 5 into the apparatus are provided on the front surface of the apparatus. Also, an operation panel 63 composed of a monitor 63a for viewing an image which is being processed in the apparatus and entry keys 63b, 63b, . . . for specifying the processing conditions for the overall apparatus, and an information reading section 90 as will be described later are provided on the front surface of the apparatus.

The stimulable phosphor sheet 1 housed in the cassette 2 was subjected to image recording in an external image recording apparatus (not shown). The cassette 2 housing the image-recorded stimulable phosphor sheet 1 is then fed through the cassette inlet 61 into the cassette holding section 10 in a direction normal to the plane of the sheet of FIG. 2. The cassette 2 is light-tight so that the stimulable phosphor sheet 1 is prevented from being exposed by external light when it is exposed to radiation to have a radiation image recorded thereon. The cassette 2 comprises a cassette body 2a in which a stimulable phosphor sheet 7 is housed and an openable cover member 2b. When the cassette 2 is fed into the cassette holding section 10, the cover member 2b is maintained in the closed position. When the stimulable phosphor sheet 1 is to be taken out of the cassette 2 at the cassette holding section 10, the cover member 2b is opened by a cover opening means 11 using a suction cup or the like. After the cover member 2b is opened, a stimulable phosphor sheet take-out means 12, employing a suction cup or the like, advances into the cassette 2, and takes the stimulable phosphor sheet 1 out of the cassette 2. The stimulable phosphor sheet take-out means 12 then transfers the stimulable phosphor sheet 1 to nip rollers 101 in the vicinity of the cassette 2, which constitute a part of the stimulable phosphor sheet conveyance means 100. The stimulable phosphor sheet 1 has been housed in the cassette 2 with the stimulable phosphor layer facing down.

Figure 3:
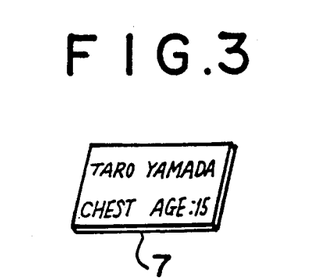
FIG. 3 is a perspective view showing an entry sheet.

On the other hand, at the time of image recording, a desired item of information about the object (ID information) such as the name, sex or date of image recording is recorded on a predetermined entry sheet 7. As shown in FIG. 2, when the cassette 2 is fed into the cassette holding section 10, the entry sheet 7 on which the ID information is recorded is placed on a holding base 91 of an information reading section 90. As shown in FIG. 3, the entry sheet 7 used in this embodiment is constituted of a light reflecting sheet such as an ordinary sheet of white paper, on which the desired ID information can be written by hand with a pen or the like. In cases where the ID information is handwritten on the entry sheet 7, no special ID information input means such as an ID information card printer is necessary, and inputting the ID information becomes simple. Also, arbitrary information can be specified at an arbitrary position on the entry sheet 7, and the number of characters used to specify the information is not limited. Therefore, the ID information input operation can be carried out more easily.

The stimulable phosphor sheet conveyance means 100 is composed of endless belts, guide plates, rollers, and sheet distributing means. The stimulable phosphor sheet 1 taken out of the cassette 2 and having a leading edge portion grasped by the nip rollers 101 is conveyed by the stimulable phosphor sheet conveyance means 100 in the direction indicated by arrow A1 guided by the sheet distributing means 102 positioned as indicated by the solid line in FIG. 1, and conveyed in the direction indicated by arrow A2. The stimulable phosphor sheet 1 is then conveyed in the directions indicated by arrows A3 and A4 to the light beam scanning section 20. Also, a secondary erasing section 80 is provided in the conveyance path of the stimulable phosphor sheet 1 for carrying out secondary erasing with an erasing light source 81 as will be described later. The erasing light source 81 is turned off while the stimulable phosphor sheet 1 taken out of the cassette holding section 10 is above the secondary erasing section 80. Also, at the time the stimulable phosphor sheet 1 is sent to the light beam scanning section 20, sheet distributing means 103 and 104 provided between the secondary erasing section 80 and the light beam scanning section 20 are maintained at the positions indicated by the solid lines, and allow the stimulable phosphor sheet 1 to be conveyed downward.

As for the stimulable phosphor sheet 1, the light beam scanning section 20 scans the stimulable phosphor sheet 1 carrying a radiation image stored thereon with a laser beam 21A which acts as the stimulating rays which cause the stimulable phosphor sheet 1 to emit light in proportion to the stored radiation energy, and photoelectrically detects the emitted light with a photoelectric read-out means 22 constituted of a photomultiplier or the like to obtain an electric image signal for use in reproducing a visible image. Reference numeral 21 denotes, by way of example, an He-Ne laser beam source, and reference numeral 23 denotes a light deflector such as a galvanometer mirror. Reference numeral 24 designates a reflection mirror for reflecting the light emitted by the stimulable phosphor sheet 1 towards a light guide member 22a of the photoelectric read-out means 22. The light guide member 22a guides the light through repeated total reflection thereof until it reaches a photodetector 22b constituted of a photomultiplier or the like. Reference numeral 25 denotes a light modulator such as an acousto-optic modulator (AOM), which is not activated when the laser beam 21A scans the stimulable phosphor sheet 1.

The stimulable phosphor sheet 1 sent to the light beam scanning section 20 is conveyed by a sub-scanning means 26 composed of guide plates 26a, 26b, 26c and 26d, nip rollers 26e and nip rollers 26f in the direction indicated by arrow A5, and the overall surface of the stimulable phosphor sheet 1 is two-dimensionally scanned by the laser beam 21A, which is deflected approximately normal to the plane of the stimulable phosphor sheet 1, and caused by the laser beam 21A to emit light in proportion to the stored radiation energy. The light emitted by the stimulable phosphor sheet 1 in the course of being scanned is photoelectrically detected by the photodetector 22b via the light guide member 22a. The emitted light is converted by the photodetector 22b into an electric image signal, and the electric image signal thus obtained is sent to an image processing circuit 27 for carrying out image processing, and the resulting signal is then stored in a memory 29. After the image read-out process for the overall surface of the stimulable phosphor sheet 1 is finished, the leading edge of the stimulable phosphor sheet 1 comes into contact with a guide plate 26d while the other edge thereof is grasped by nip rollers 26f. From this position, the direction of travel of the stimulable phosphor sheet 1 is reversed, and the sheet 1 is conveyed in the direction indicated by arrow A6.

As for the radiation image read-out process, there has heretofore been known a method wherein a preliminary read-out is carried out to approximately ascertain the radiation image stored on the stimulable phosphor sheet 1 prior to carrying out the aforesaid image read-out process (final read-out) for obtaining an electric image signal for use in reproducing a visible image. Image read-out conditions for the final read-out or the like are selected based on the information obtained in the preliminary read-out, and the final read-out is carried out by use of the selected read-out conditions.

As disclosed in, for example, Japanese Unexamined Patent Publication No. 58(1983)-67240, the preliminary read-out may be conducted by scanning the stimulable phosphor sheet 1 with stimulating rays having stimulation energy lower than the level of the stimulation energy of the laser beam (stimulating rays) used in the final read-out, and detecting the light emitted by the stimulable phosphor sheet 1 in the course of the scanning with a photoelectric read-out means.

The light beam scanning section 20 may be constituted to carry out only the final read-out or both the preliminary read-out and the final read-out. For example, the preliminary read-out may be carried out by conveying the stimulable phosphor sheet 1 in the direction indicated by arrow A5. The direction of travel of the stimulable phosphor sheet 1 may then be reversed so that it is conveyed in the direction indicated by arrow A6 to a read-out start position, and then the final read-out may be carried out while the stimulable phosphor sheet 1 is again conveyed in the direction indicated by arrow A5. The optical means in the light beam scanning section 20 are not limited to those mentioned above. For example, as proposed in Japanese Patent Application No. 60(1985)-156255, a long photomultiplier may be disposed along the main scanning line as the photoelectric read-out means for detecting the light emitted by the stimulable phosphor sheet 1.

Figure 4:
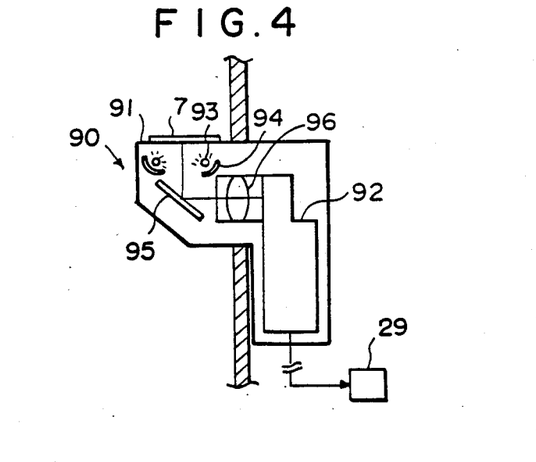
FIG. 4 is a side view showing the information reading section.

At the information reading section 90, the ID information recorded on the entry sheet 7 is read. As shown in FIG. 4, part of the information reading section 90 protrudes outwardly from the front surface of the apparatus, and the entry sheet 7 is held on an upper face of the information reading section 90. The remainder of the information reading section 90 accommodates a CCD 92 and is provided inside of the apparatus. Also, a lamp 93 and a reflection plate 94 are provided below the holding base 91. The lamp 93 is turned on when the ID information is to be read from the entry sheet 7. Light produced by the lamp 93 is reflected by the reflection plate 94 and impinges upon the entry sheet 7. The enty sheet 7 is constituted of a light reflecting sheet as mentioned above, and the holding base 91 is constituted of a light-permeable material. Therefore, light reflected by the entry sheet 7 is in turn reflected by a mirror 95, and condensed by a lens 96 provided in the optical path. The condensed light impinges upon the CCD 92, and the ID information recorded on the entry sheet 7 is photoelectrically detected by the CCD 92. An electric signal, representing the ID information obtained by the CCD 92, is sent to a memory 29, which is located in the light beam scanning section 20, for storage together with the image signal detected from a corresponding stimulable phosphor sheet 1. The signals representing the ID information and the radiation image may also be stored in two different memories. At the time an image is reproduced, as will be described later, the signals representing the ID information and the radiation image, which correspond to each other, may be read from the two memories.

The image read-out from the single stimulable phosphor sheet 1 and the reading of the corresponding ID information are carried out in the manner described above. A comparatively long time is taken for reading out an image at the light beam scanning section 20, and therefore it often occurs that processing of the stimulable phosphor sheets cannot be achieved efficiently in cases where a next cassette 2 housing an image-recorded stimulable phosphor sheet 1 can be loaded to the cassette holding section 10 only after processing of the preceding stimulable phosphor sheet 1 is finished at the light beam scanning section 20. Accordingly, this embodiment is provided with a stacker 40, so that the stimulable phosphor sheet 1 fed out of the cassette holding section 10 may be conveyed into the stacker 40 where it waits to be conveyed to the light beam scanning section 20 until conditions so merit.

The stacker 40 comprises a plurality of stimulable phosphor sheet housing compartments 42, 42, . . . defined by partitions 41, 41, . . . , and is moveable vertically in the direction indicated by arrow C between the position indicated by the solid line in FIG. 1 and the position indicated by the broken line, so that every stimulable phosphor sheet housing compartment 42 can be grasped by nip rollers 105 disposed in the vicinity of the stacker 40. In the course of conveying the stimulable phosphor sheet 1 fed out of the cassette holding section 10 into the stacker 40, the sheet distributing means 104 is moved to the position indicated by the broken line for guiding the stimulable phosphor sheet 1 toward the stacker 40. The stimulable phosphor sheet 1 is conveyed into a predetermined stimulable phosphor sheet housing compartment 42 of the stacker 40. After the stimulable phosphor sheet 1 is freed from the nip rollers 105, the stimulable phosphor sheet 1 falls due to gravity and is held in the stimulable phosphor sheet housing compartment 42 with its leading edge contacting a stopper 43. When the stimulable phosphor sheet 1 is to be fed out of the stacker 40, the stacker 40 is moved until the stimulable phosphor sheet housing compartment 42 in which the stimulable phosphor sheet 1 is housed faces the nip rollers 105, the stopper 43 is then moved to the position indicated by the broken line to push up the stimulable phosphor sheet 1, and the leading edge portion of the stimulable phosphor sheet 1 is grasped by the nip rollers 105. The stimulable phosphor sheet 1 grasped by the nip rollers 105 is guided by the sheet distributing means 104 maintained at the position indicated by the broken line, is conveyed upward by the stimulable phosphor sheet conveyance means 100, and is then conveyed in the directions indicated by arrows A3 and A4 into the light beam scanning section 20. At this time, the stimulable phosphor sheet 1 fed out of the stacker 40 is conveyed upward, and the surface of the stimulable phosphor sheet 1 provided with a stimulable phosphor faces up (i.e. faces in the direction the laser beam comes from) in the light beam scanning section 20.

In cases where the stacker 40 is used in the manner described above, the reading of ID information corresponding to each stimulable phosphor sheet 1 at the information reading section 90 may be carried out each time a cassette 2 is fed to the cassette holding section 10. The image signals detected at the light beam scanning section 20 may be stored in such a way that ID information stored in advance is correctly associated with an image signal.

After image read-out from a stimulable phosphor sheet 1 is finished at the light beam scanning section 20, the stimulable phosphor sheet 1 is conveyed by the stimulable phosphor sheet conveyance means 100 in the directions indicated by arrows A7, A8, A9 and A10 into the erasing section 30. At this time, the sheet distributing means 102 is maintained at the position indicated by the broken line, and the sheet distributing means 103 and 104 are maintained at the positions indicated by the solid lines.

At the erasing section 30, radiation energy remaining on the stimulable phosphor sheet 1 after an image has been read out therefrom is erased. Specifically, a part of the radiation energy stored on the stimulable phosphor sheet 1 at the image recording step remains stored thereon after image read-out is carried out. In order to reuse the stimulable phosphor sheet 1, the residual radiation energy is erased at the erasing section 30. In this embodiment, the erasing section 30 is provided with a plurality of erasing light sources 31, 31, ... constituted of fluorescent lamps, tungsten-filament lamps, sodium lamps, xenon lamps, iodine lamps or the like, and the stimulable phosphor sheet 1 is exposed to the erasing light emitted by the erasing light sources 31, 31, ... for releasing residual radiation energy while the stimulable phosphor sheet 1 is conveyed along a guide plate 32 in the direction indicated by arrow A11. At the erasing section 30, any known erasing method may be used. For example, erasing may be conducted by heating or by a combination of exposure to erasing light with heating. The stimulable phosphor sheet 1 is conveyed in the reverse direction indicated by arrow A12 after being conveyed up to the position indicated by the broken line, and a guide plate for supporting the edge of the stimulable phosphor sheet 1 should preferably be provided outside of the erasing section 30. Also, as will be described later, if a stimulable phosphor sheet housing tray 6 is provided close to the erasing section 30, the tray 6 may be utilized as a guide.

After the stimulable phosphor sheet 1 is erased at the erasing section 30, the stimulable phosphor sheet 1 is conveyed by the stimulable phosphor sheet conveyance means 100 in the directions indicated by arrows A13 and A14, and is housed in the empty stimulable phosphor sheet housing compartment 42 of the stacker 40 by being guided by the sheet distributing means 104 which has moved to the position indicated by the broken line. In cases where some erased reusable stimulable phosphor sheets 1, 1, ... are housed in the stacker 40 in this manner, the erased reusable stimulable phosphor sheets 1 can be conveyed into empty cassettes 2 immediately after the image-recorded stimulable phosphor sheets 1 are fed out of the cassettes 2 at the cassette holding section 10. When the stimulable phosphor sheet 1 is to be fed out of the stacker 40 and conveyed to the cassette holding section 10, the sheet distributing means 104 is moved to the position indicated by the broken line, the sheet distributing means 102 and 103 are moved to the positions indicated by the solid lines, and the stimulable phosphor sheet 1 is conveyed by the stimulable phosphor sheet conveyance means 100 in the directions indicated by arrows A15, A16 and A17 into the cassette 2. A stimulable phosphor sheet 1 may often be maintained in the stacker 40 for a long time after it was subjected to erasing at the erasing section 30. When a predetermined time elapses after erasing was carried out on the stimulable phosphor sheet 1, the stimulable phosphor sheet 1 will store energy from radiation emitted by radioactive isotopes such as Ra226 and K40, which are contained in trace amounts in the stimulable phosphor, or energy from environmental radiation such as cosmic rays and X-rays emitted by other X-ray sources. Energy from these types of radiation stored on the stimulable phosphor sheet 1 causes noise in a next radiation image recorded on the stimulable phosphor sheet 1. In order to prevent noise generation, a secondary erasing section 80 for irradiating erasing light to the stimulable phosphor sheet 1 is disposed in the conveyance path of the stimulable phosphor sheet 1 between the stacker 40 and the cassette holding section 10. The erasing light source 81 at the secondary erasing section 80 is turned on only when the stimulable phosphor sheet 1 fed out of the stacker 40 is conveyed toward the cassette holding section 10, thereby to release radiation energy stored on the stimulable phosphor sheet 1 while the stimulable phosphor sheet 1 was being housed in the stacker 40. The cassette 2 loaded with the erased reusable stimulable phosphor sheet 1 in this manner is taken out of the read-out apparatus for reuse in image recording. In this embodiment, the stimulable phosphor sheet 1 erased at the erasing section 30 may be immediately conveyed into the cassette 2. In this case, the stimulable phosphor sheet 1 conveyed in the direction indicated by arrow A13 from the erasing section 30 may first be conveyed downward and then conveyed upward and into the cassette 2. As a result, the surface of the stimulable phosphor sheet 1 provided with the stimulable phosphor layer will face down when the stimulable phosphor sheet 1 is housed in the cassette 2.

On the other hand, after the first stimulable phosphor sheet 1 as mentioned above is conveyed out of the light beam scanning section 20, a single recording sheet 4 may be taken by a suction means 51 out of the recording sheet feed magazine 5 at the recording sheet feeding section 50, and transferred to nip rollers 111 constituting part of the recording sheet conveyance means 110. The recording sheet 4 is conveyed by the nip rollers 111 along a guide plate 112 in the direction indicated by arrow B1, and is then conveyed by the part of the recording sheet conveyance means 110 used in common with the stimulable phosphor sheet conveyance means 100 into the light beam scanning section 20. At the light beam scanning section 20, the radiation image which was read from the stimulable phosphor sheet 1 in the manner described above is recorded on the recording sheet 4 while the recording sheet 4 is being conveyed by the aforesaid sub-scanning means 26 in the direction indicated by arrow B2.

At the time the recording sheet 4 is thus conveyed in the light beam scanning section 20, the light modulator 25 is operated in accordance with the image signal which was generated from the image stored on the stimulable phosphor sheet 1, and the photodetector 22b is turned off. The recording sheet 4 is scanned by the laser beam 21A now acting as the recording light modulated by the light modulator 25 and deflected by the light deflector 23, so that the radiation image which was stored on the stimulable phosphor sheet 1 is reproduced on the recording sheet 4. Thereafter, the electric signals detected at the information reading section 90 and representing ID information which corresponds to the aforesaid stimulable phosphor sheet 1 are sent from the memory 29 to the light modulator 25. The light modulator 25 modulates the laser beam 21A in accordance with the electric signals. Therefore, together with the radiation image, the ID information is reproduced on the recording sheet 4 by the laser beam 21A thus modulated.

After the reproduction of the radiation image and the reproduction of the ID information on the recording sheet 4 are finished at the light beam scanning section 20, the recording sheet 4 is conveyed by the recording sheet conveyance means 110 in the directions indicated by arrows B3, B4 and B5. At this time, the sheet distributing means 104 is maintained at the position indicated by the solid line, and the sheet distributing means 103 is moved to the position indicated by the broken line, thereby to guide the recording sheet 4 in the direction indicated by arrow B6 and to have the leading edge of the recording sheet 4 grasped between ejection rollers 113. By way of example, the ejection rollers 113 convey the recording sheet 4 to an automatic developing section 70 connected to the read-out apparatus. Alternatively, a tray or the like may be positioned close to the ejection rollers 113, and the recording sheets 4, 4, . . . may be sequentially ejected into the tray or the like. Also, a holding section for the recording sheet housing tray may be provided inside of the read-out apparatus, and the recording sheets 4, 4, . . . may be taken out of the apparatus while housed in the tray and sent to an external automatic developing machine.

Figure 5:
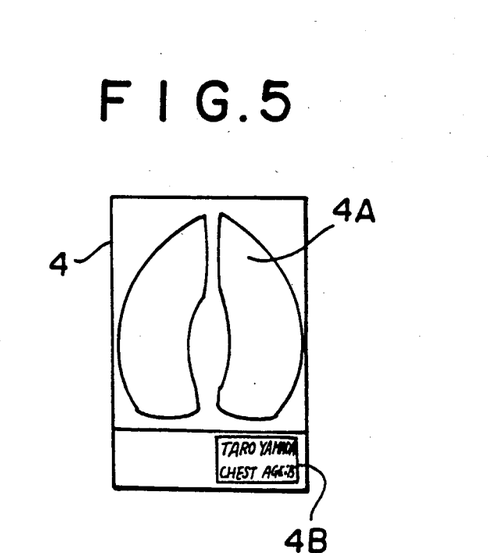
FIG. 5 is a plan view showing a recording sheet on which a radiation image and ID information are reproduced.

As shown in FIG. 5, after development processing has been carried out on the recording sheet 4 in the automatic developing machine 70, a radiation image 4A and ID information 4B are ultimately reproduced as visible images on the recording sheet 4. In this embodiment, when reproduction is carried out on a single recording sheet 4 at the light beam scanning section 20, the radiation image 4A is first reproduced by modulating the laser beam 21A in accordance with an image signal, and then the ID information 4B is reproduced by the laser beam 21A modulated in accordance with the electric signals representing the ID information at the tailing edge portion of the recording sheet 4 as viewed in the direction of conveyance. On the recording sheet 4, the ID information 4B is reproduced below the radiation image 4A. However, the layout of the ID information 4B and the radiation image 4A on the recording sheet 4 may be changed as desired, and the ID information 4B may be reproduced overlapping the radiation image 4A. Also, the electric signals representing the ID information may be corrected by an arbitrary correction means to adjust the position of the characters in the information, the degree of contraction or the like, and may then be reproduced on the recording sheet 4.

On the other hand, in an external image recording apparatus, besides recording an image on a single stimulable phosphor sheet 1 housed in the cassette 2, image recording may be carried out on a plurality of the stimulable phosphor sheets 1, 1, . . . taken out of a sheet feed magazine one by one for continuous image recording or the like. The stimulable phosphor sheets 1, 1, . . . each carrying a radiation image stored thereon are sequentially housed in a sheet housing magazine, which is then sent to a read-out apparatus. The radiation image read-out and reproducing apparatus in accordance with the present invention may be provided with the aforesaid cassette holding section 10, and a magazine holding section disposed for releasably holding the stimulable phosphor sheet magazine (i.e. the aforesaid sheet feed magazine) correctly positioned with respect to the stimulable phosphor sheet conveyance means 100, so that read-out and erasing can be carried out also for the stimulable phosphor sheets fed out of the stimulable phosphor sheet magazine. The magazine holding section may be provided at any position insofar as it approximately aligns with the aforesaid light beam scanning section 20, the erasing section 30 and other sections in the vertical direction and is connected with the stimulable phosphor sheet conveyance means 100. Also, as indicated by the chained line in the drawing, the cassette holding section 10 and the magazine holding section may be formed integrally with each other so that the cassette holding section 10 can be loaded with both the cassette 2 and a stimulable phosphor sheet magazine 3. In cases where the magazine holding section is provided, it is necessary to provide a tray holding section for holding a tray in which the stimulable phosphor sheets fed out of the stimulable phosphor sheet magazine one by one and subjected to image read-out and erasing are to be housed. The tray holding section may be provided at any position connected with the stimulable phosphor sheet conveyance means 100. However, the tray holding section should preferably be provided outward from the erasing section 30 so that the tray 6 is positioned adjacent to the erasing section 30 as indicated by the chained line in the drawing. In this case, the tray 6 can act in the same manner as a guide for guiding a stimulable phosphor sheet 1 in the course of the erasing. Also, as for a stimulable phosphor sheet fed out of the stimulable phosphor sheet magazine, the stimulable phosphor sheet can be made to fall into the tray 6 and housed therein after erasing is finished.

With the aforesaid embodiment wherein image read-out from the stimulable phosphor sheet 1 and image reproduction on the recording sheet 3 are carried out by commonly utilizing the main scanning means and the sub-scanning means at the light beam scanning section 20, the radiation image recording and reproducing system as a whole can be made small in size and the manufacturing cost can be made lower than when a read-out apparatus and a reproducing apparatus are provided independently of each other as in conventional systems. As for the main scanning means, two different sets of the main scanning means may be provided for read-out and reproduction respectively. Also, in the aforesaid embodiment wherein the stimulable phosphor sheet 1 and the recording sheet 4 are conveyed along a common vertical conveyance path, and the light beam scanning section 20, the erasing section 30 and other sections are provided one above another substantially horizontal to the conveyance path in the light beam scanning section 20, the apparatus can be made markedly smaller.

Moreover, with the aforesaid embodiment, ID information handwritten on an entry sheet 7 can be directly reproduced on the recording sheet 4. Therefore, even ID information that could not be indicated on the recording sheet can be reproduced on the recording sheet by writing it on the entry sheet.

Furthermore, in the aforesaid embodiment, reproduction of a radiation image read out from a single stimulable phosphor sheet 1 is, by way of example, carried out on a single recording sheet 3 immediately after the image read-out is carried out on the stimulable phosphor sheet 1. Or instead, the capacity of the memory 29 may be increased, image read-out may be carried out continuously for a plurality of the stimulable phosphor sheets at the light beam scanning section 20, image signals thus detected may be stored in the memory 29, and then image reproduction may be carried out continuously on a plurality of recording sheets. Also, instead of reproducing all of the read-out radiation images as hard copies on recording sheets, radiation images may be displayed on a display device such as a CRT, and only the necessary images may be reproduced as hard copies on recording sheets.

In the aforesaid embodiment, the cassette housing the erased reusable stimulable phosphor sheet 1 may be directly loaded to an image recording apparatus for ruse. However, the stimulable phosphor sheet 1 on which image read-out has been finished may be temporarily housed in an appropriate housing means which is not of the type loaded into the image recording apparatus. In cases where such a housing means is used, the erasing section need not necessarily be provided, and the housing means in which the stimulable phosphor sheet is housed may be taken out of the radiation image read-out and reproducing apparatus and sent to an independent erasing apparatus. Also, the configuration and layout of the respective sections are not limited to those in the aforesaid embodiment. For example, besides the aforesaid cassette holding section, a second cassette holding section for holding an empty cassette into which the erased reusable stimulable phosphor sheet is to be fed may be provided, and the stimulable phosphor sheet feeding section and the stimulable phosphor sheet housing section may thus be separated from each other. Also, in cases where processing of a stimulable phosphor sheet may be carried out after processing of the preceding stimulable phosphor sheet is finished, the stacker may be omitted to make the apparatus smaller.

Also, the recording sheet used in the radiation image read-out and reproducing apparatus in accordance with the present invention is not limited to silver halide photographic film, on which an image is reproduced by means of light and the reproduced image is developed by use of an automatic developing machine (section), but may be a heat-sensitive recording sheet, a heat development photosensitive material, an instant film or the like. For example, if a heat-sensitive recording sheet, on which image reproduction is effected by means of heat from a laser beam, is used as the recording sheet, the configuration of the light beam scanning section may be identical to that in the aforesaid embodiments, and the automatic developing machine (section) becomes unnecessary. Therefore, a recording sheet housing section may be provided, and the recording sheets, having an image reproduced thereon, may be stacked in a tray or the like. If the heat-sensitive recording sheet is of the type wherein image fixing is effected by exposure to light after thermal image reproduction, image fixing may be carried out by providing a light irradiation means in the recording sheet conveyance path between the light beam scanning section and the recording sheet housing section. Also, the aforesaid erasing section may be disposed prior to the recording sheet housing section and also utilized as the light irradiation means.

The information recording means on which ID information is to be specified is not limited to the light reflecting entry sheet, and may be of any type insofar as the necessary ID information can be specified in such a way that it can be read photoelectrically. The ID information need not necessarily be handwritten. Also, the CCD may be of the type for detecting light passing through the entry sheet, instead of detecting light reflected by the entry sheet.

We claim:

1. A radiation image read-out and reproducing apparatus comprising:
   (i) a stimulable phosphor sheet feeding section for housing a stimulable phosphor sheet carrying a radiation image stored theron, and feeding out said housed stimulable phosphor sheet,
   (ii) a recording sheet feeding section for housing recording sheets and feeding out said housed recording sheets one by one,
   (iii) an information reading section for holding an information recording means, which carries photoelectrically readable information different from said radiation image and represented by characters, or the like, and provided with an information reading means for photoelectrically reading said information,
   (iv) a light beam scanning section provided with a read-out main scanning means for deflecting a light beam with a light deflector and scanning said light beam in a main scannning direction across a stimulable phosphor sheet, a reproducing main scanning means for deflecting a light beam with a light deflector and scanning said light beam in the main scanning direction across a recording sheet, and a sub-scanning means for causing said stimulable phosphor sheet and said recording sheet, respectively, to be scanned in a sub-scanning direction by moving the sheets in a direction approximately perpendicular to said main scanning direction, wherein read-out of a radiation image is carried out by causing a stimulable phosphor sheet to emit light carrying information about said radiation image when exposed to the light beam in said read-out main scanning means and detecting the emitted light by use of a light detection means, and a radiation image thus read out and information detected by said information reading means are reproduced together on a recording sheet by modulating the light beam in said reproducing main scanning means in accordance with said radiation image thus read out and said information detected by said information reading means, (v) a stimulable phosphor sheet conveyance means for receiving a stimulable phosphor sheet fed out of said stimulable phosphor sheet feeding section, conveying said stimulable phosphor sheet to said light beam scanning section, and thereafter conveying said stimulable phosphor sheet out of said light beam scanning section, and (vi) a recording sheet conveyance means for receiving a recording sheet fed out of said recording sheet feeding section, conveying said recording sheet to said light beam scanning section, and thereafter conveying said recording sheet out of said light beam scanning section.

2. An apparatus as defined in claim 1 wherein said light deflector of said read-out main scanning means and said light deflector of said reproducing main scanning means are common to each other.

3. An apparatus as defined in claim 2 wherein a light source for said light beam of said read-out main scanning means and a light source for said light beam of said reproducing main scanning means are common to each other.

4. An apparatus as defined in claim 1 wherein at least a part of said stimulable phosphor sheet conveyance means and at least a part of said recording sheet conveyance means are common to each other.

5. An apparatus as defined in claim 1 wherein said information reading means comprises a charge coupled device.

* * * * *